United States Patent
Schenk et al.

(10) Patent No.: US 11,910,760 B2
(45) Date of Patent: Feb. 27, 2024

(54) WATERING ROBOT AND ASSOCIATED WATERING SYSTEM

(71) Applicant: HUSQVARNA AB, Huskvarna (SE)

(72) Inventors: Christoph Schenk, Oberdischingen (DE); Rainer Kaupp, Blaubeuren (DE); Rudolf Pfau, Erolzheim (DE); Florian Soor, Günzburg (DE)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 18/035,621

(22) PCT Filed: Jun. 2, 2021

(86) PCT No.: PCT/EP2021/064816
§ 371 (c)(1),
(2) Date: May 5, 2023

(87) PCT Pub. No.: WO2022/096159
PCT Pub. Date: May 12, 2022

(65) Prior Publication Data
US 2023/0389490 A1 Dec. 7, 2023

(30) Foreign Application Priority Data
Nov. 6, 2020 (EP) .................................. 20206106

(51) Int. Cl.
*A01G 25/09* (2006.01)
*A01D 43/14* (2006.01)
*A01D 101/00* (2006.01)

(52) U.S. Cl.
CPC ............. *A01G 25/09* (2013.01); *A01D 43/14* (2013.01); *A01D 2101/00* (2013.01)

(58) Field of Classification Search
CPC ...... A01G 25/09; A01G 25/16; B05B 13/005; A01D 43/14; A01D 2101/00
(Continued)

(56) References Cited

U.S. PATENT DOCUMENTS 1,891,854 A    12/1932  Wade
6,431,475 B1   8/2002   Williams
(Continued)

FOREIGN PATENT DOCUMENTS

CN    204810972 U    12/2015
CN    107534677 A    1/2018
(Continued)

OTHER PUBLICATIONS

International Search Report and Written Opinion from International Application No. PCT/EP2021/064816 dated Sep. 22, 2021, all enclosed pages cited.

*Primary Examiner* — Steven J Ganey
(74) *Attorney, Agent, or Firm* — Burr & Forman LLP

(57) ABSTRACT

A watering system (100) includes a watering robot (102). The watering robot (102) further includes an irrigation controller (110) configured to operate within a region (114). A connector portion (106) is coupled to the body (104), and is adapted to couple with the one or more water supplying units (116) to receive water therefrom. The watering system (100) is characterized in that a sensor (130) of the watering robot (102) detects the one more water supplying units (116) to selectively integrates therewith. An actuator (140) of the watering robot (102) at least partially lifts up the watering robot (102) with respect to a ground surface (120) of the region (114). The watering robot (102) automatically couples with the one or more water supplying units (116) through the connector portion (106), and the actuator (140) at least partially lifts up the watering robot (102) with respect to the ground surface (120).

6 Claims, 6 Drawing Sheets

(58) Field of Classification Search
USPC .................. 239/69, 289, 723; 700/283, 284
See application file for complete search history.

(56) References Cited

U.S. PATENT DOCUMENTS

| | | | |
|---|---|---|---|
| 8,989,907 B2 | 3/2015 | Schmidt et al. | |
| 9,265,204 B2 | 2/2016 | Younis et al. | |
| 2013/0153673 A1* | 6/2013 | Younis | A01G 25/16 239/69 |
| 2015/0359185 A1 | 12/2015 | Guy | |
| 2017/0020087 A1 | 1/2017 | Younis et al. | |
| 2017/0361456 A1 | 12/2017 | He et al. | |
| 2021/0360853 A1* | 11/2021 | Herrera | A01D 34/74 |

FOREIGN PATENT DOCUMENTS

| | | |
|---|---|---|
| CN | 107846852 A | 3/2018 |
| CN | 108684294 A | 10/2018 |
| CN | 108702922 A | 10/2018 |
| CN | 208095202 U | 11/2018 |
| CN | 109006419 A | 12/2018 |
| CN | 109566065 A | 4/2019 |
| DE | 102017116659 A1 | 1/2019 |
| WO | 2015173825 A1 | 11/2015 |
| WO | 2017133625 A1 | 8/2017 |
| WO | 2018014838 A1 | 1/2018 |

\* cited by examiner

WATERING ROBOT AND ASSOCIATED WATERING SYSTEM

TECHNICAL FIELD

The present disclosure relates to a watering system. More specifically, the present disclosure relates to the watering system which allows convenient and damage-free watering using mobile devices.

BACKGROUND

Watering system is generally used to irrigate flora (i.e. plants) in many outdoor installations such as gardens, lawns, and the like. Typically, the watering system includes a distribution mechanism having a series of hoses, sprinklers, and the like to supply a liquid (mostly water) to the flora in the outdoor applications. The distribution mechanism leads to issues related to range, maintenance, among other implementation constraints mostly due to reliance on the hoses of the distribution mechanism.

Further, there have been concerns regarding need of separate mowing and sprinkling devices to suit user expectations. This leads to increased spatial footprint, maintenance, and other demerits associated with use of different devices for mowing and sprinkling operations. Moreover, conventional mowing devices find it challenging to couple or integrate with irrigation/sprinklings means to take care of both mowing and sprinkling. Further, conventional mowing devices may damage the surface of the outdoor installation during irrigation. This may happen due to different forces and pressures experienced by ground engaging means (say tires and the like) of the conventional mowing devices during such irrigation operations.

CN109,566,065 patent reference (hereinafter referred to as '065 reference) discloses an intelligent lawn nursing robot system. The system includes a base station and an intelligent lawn nursing robot. The intelligent lawn nursing robot comprises a shell, a moving module, a cutting module, a control module, and a watering module. The control module is used for controlling the cutting module and the watering module to work; Further, the intelligent lawn nursing robot is in butt joint with the base station under the watering mode and triggers the base station to provide a water source required for current watering for the watering module. However, the '065 reference seems short of an arrangement to allow change in height or lifting up of the lawn nursing robot, such as during watering/irrigation without interacting with a ground surface.

U.S. Pat. No. 6,431,475 patent reference discloses an irrigation system. The irrigation system includes valve coupler aligner provided with movable carts. The valve coupler incorporates the available weight at the swing arm outer end to influence downward travel of the outer end to forcibly align with, connect to, and forcibly open successive access valves. Upward and downward travel of the valve coupler is provided by an independent wheel lifter as part of the transporter. Further, hydraulic cylinders pivotably mount to hydraulic cylinder mounts between the upper ends of a frame crossbeam and transport wheel legs.

An example of a watering system is provided in German patent application DE102008041323A1 (hereinafter referred to as '323 reference). The '323 reference discloses an irrigation robot which includes a drive means for steering and moving the irrigation robot on a working region. Further, an irrigation means, and an intelligence means are disposed on the robot for autonomously controlling the drive means and/or the irrigation means. Preferably, the control of the drive means is based on positional means information signals of the robot obtained from a GPS, satellite signals, radar, infrared sensors, cameras and/or by determining a length/angle of hose unwound from a real which is connected to the robot. Further, the robot may include a docking means, for docking to at least one supply station. However, the '323 reference falls short of providing a simple, and user-friendly multi-functional machine which allows mowing along with on-demand irrigation which protects the working region from any damage from the irrigation robot.

Thus, there is a need for an improved watering system which allows on-demand benefits of both mowing and irrigation (i.e. sprinkling) with a single machine such as a robotic mower. Further, the robotic mower is required to avoid any damage to the ground surfaces during irrigation.

SUMMARY

In view of the above, it is an objective of the present invention to solve or at least reduce the drawbacks discussed above. The objective is at least partially achieved by a watering system. The watering system includes a watering robot. The watering robot includes an irrigation controller configured to operate within a region. One or more water supplying units are configured to operate within the region. The watering robot includes a connector portion coupled to the body. The connector portion couples with the one or more water supplying units and receives water from the one or more water supplying units. The watering system is characterized in that a sensor of the watering robot detects the one more water supplying units within the region. Further, the watering robot selectively integrates with the one or more water supplying units based on the detection by the sensor. An actuator of the watering robot at least partially lift up the watering robot with respect to a ground surface of the region. The watering robot automatically couples with the one or more water supplying units through the connector portion. And, the actuator at least partially lifts up the watering robot with respect to the ground surface of the region to irrigate at least a part thereof. Thus, the present disclosure provides a simple, efficient, and convenient watering system which allows combined benefits of operating (say mowing) and irrigating by mobilization of the watering robot. Further, the watering robot allows desired irrigation without contact with any ground surface and thereby protecting the ground surface from damage during irrigation.

According to an embodiment of the present invention, the irrigation controller includes an aquacontour sprinkler. The aquacontour sprinkler allows precise and controlled watering along contours of the desired parts of the region.

According to an embodiment of the present invention, a watering robot includes a body supported on a plurality of ground engaging means. The ground engaging means are adapted to propel the body on the region. The region includes one or more water supplying units. The watering robot includes a connector portion coupled to the body. The connector portion is adapted to couple with the one or more water supplying units and receive water from the one or more water supplying units. The watering robot is characterized in that a sensor of the watering robot detects the one more water supplying units within the region. Further, the watering robot selectively integrates with the one or more water supplying units based on the detection by the sensor. An actuator of the watering robot at least partially lift up the watering robot with respect to a ground surface of the region. The watering robot automatically couples with the one or more water supplying units through the connector portion. And, the actuator at least partially lifts up the watering robot with respect to the ground surface of the region to irrigate at least a part thereof. This prevents undesired pressure and associated damage on grass or the ground surface from the ground engaging means (i.e. tires) of the watering robot.

According to an embodiment of the present invention, the watering robot is adapted to be integrated with a lawn mower, or any other machine or equipment present within the region. This provides additional capabilities for the equipment with which the watering robot is coupled.

According to an embodiment of the present invention, the region is a lawn, or any other gardening/outdoor region. Thus, comprehensive watering/mowing solution may be provided by the watering robot for lawn/garden regions.

According to an embodiment of the present invention, the watering robot integrates with a built-in water pipeline of the one or more water supplies. This allows automatic watering. The integration of the watering system with the built-in water pipeline prevents any cumbersomeness of combining the watering robot and the water supplying units together.

Other features and aspects of this invention will be apparent from the following description and the accompanying drawings.

BRIEF DESCRIPTION OF THE DRAWINGS

The invention will be described in more detail with reference to the enclosed drawings, wherein.

DESCRIPTION OF EMBODIMENTS

Figure 1:
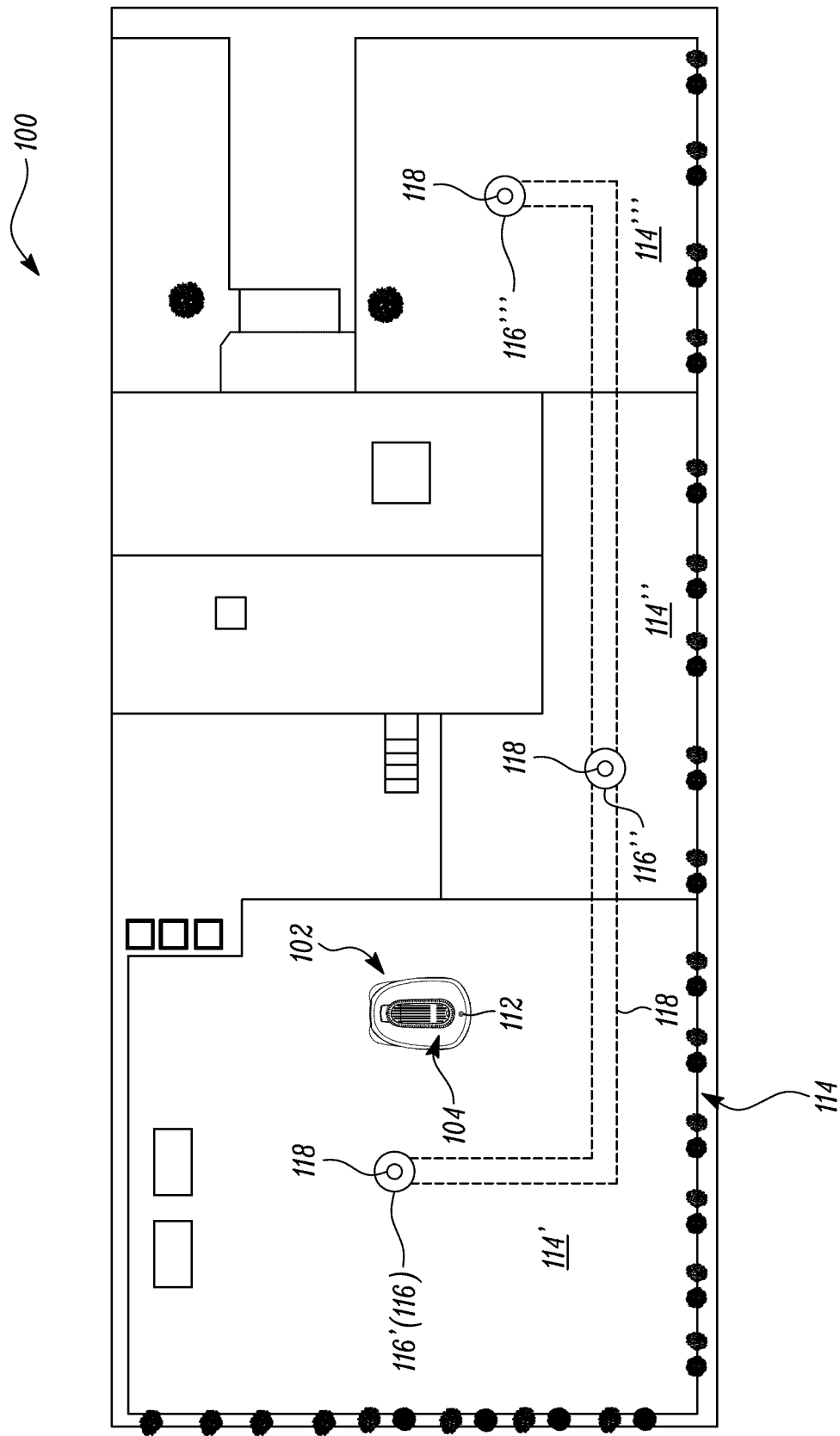
FIG. 1 shows a watering system, in accordance with an aspect of the present disclosure.

The present invention will be described more fully hereinafter with reference to the accompanying drawings, in which example embodiments of the invention incorporating one or more aspects of the present invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. For example, one or more aspects of the present invention may be utilized in other embodiments and even other types of structures and/or methods. In the drawings, like numbers refer to like elements.

Certain terminology is used herein for convenience only and is not to be taken as a limitation on the invention. For example, "upper", "lower", "front", "rear", "side", "longitudinal", "lateral", "transverse", "upwards", "downwards", "forward", "backward", "sideward", "left," "right," "horizontal," "vertical," "upward", "inner", "outer", "inward", "outward", "top", "bottom", "higher", "above", "below", "central", "middle", "intermediate", "between", "end", "adjacent", "proximate", "near", "distal", "remote", "radial", "circumferential", or the like, merely describe the configuration shown in the Figures. Indeed, the components may be oriented in any direction and the terminology, therefore, should be understood as encompassing such variations unless specified otherwise.

In the drawings and specification, there have been disclosed preferred embodiments and examples of the invention and, although specific terms are employed, they are used in a generic and descriptive sense only and not for the purpose of limitation of the scope of the invention being set forth in the following claims.

FIG. 1 illustrates a watering system 100. The watering system 100 may be provided with any outdoor installation such as gardens, lawns, and the like. The watering system 100 may be capable of being mowed and/or irrigated by a mobile device such as, but not limited to, robotic mowers, lawn mowers and the like.

Figure 2:
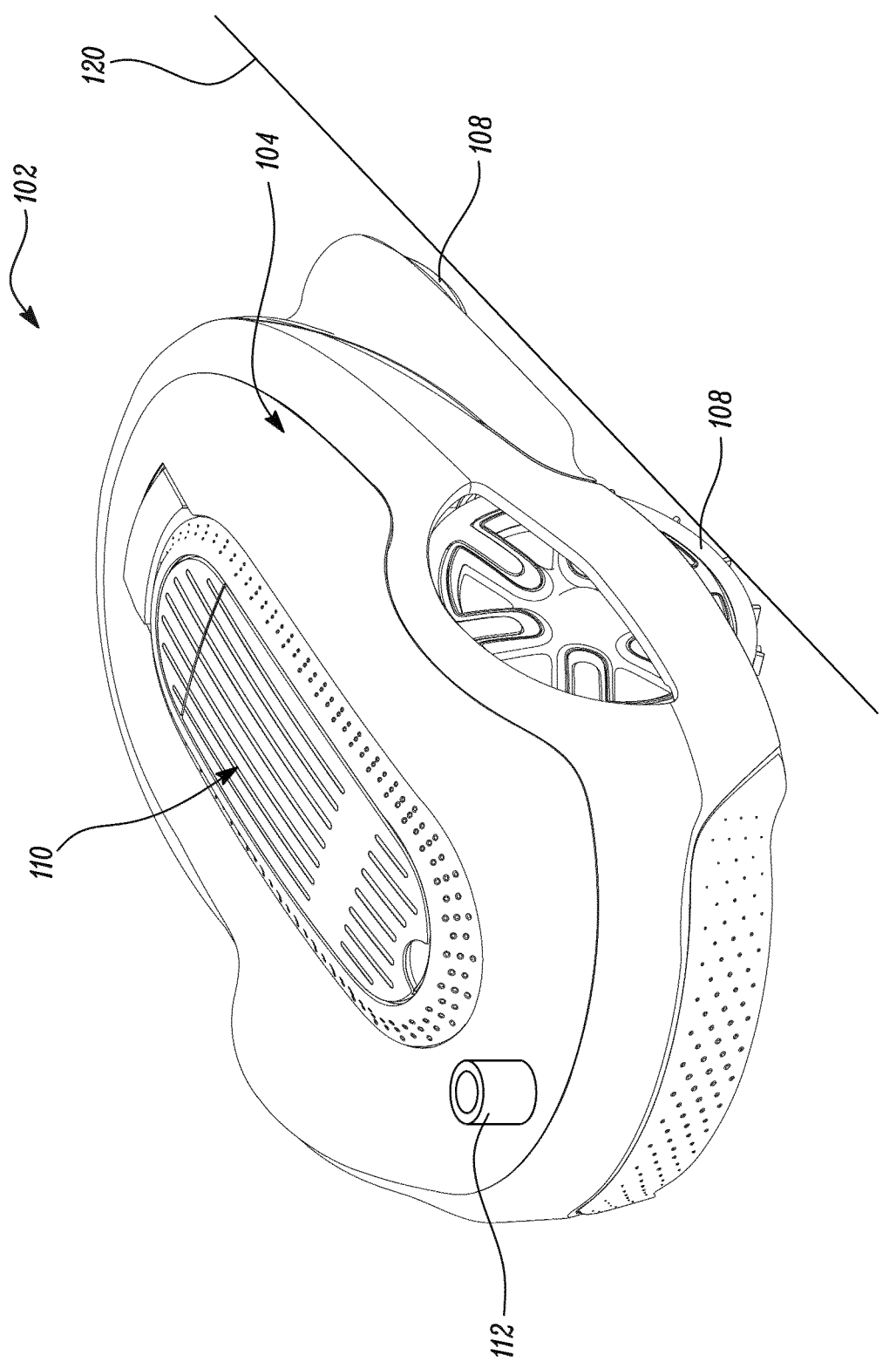
FIG. 2 shows a perspective view of a watering robot which operates with the watering system, in accordance with an aspect of the present disclosure.
Figure 3:
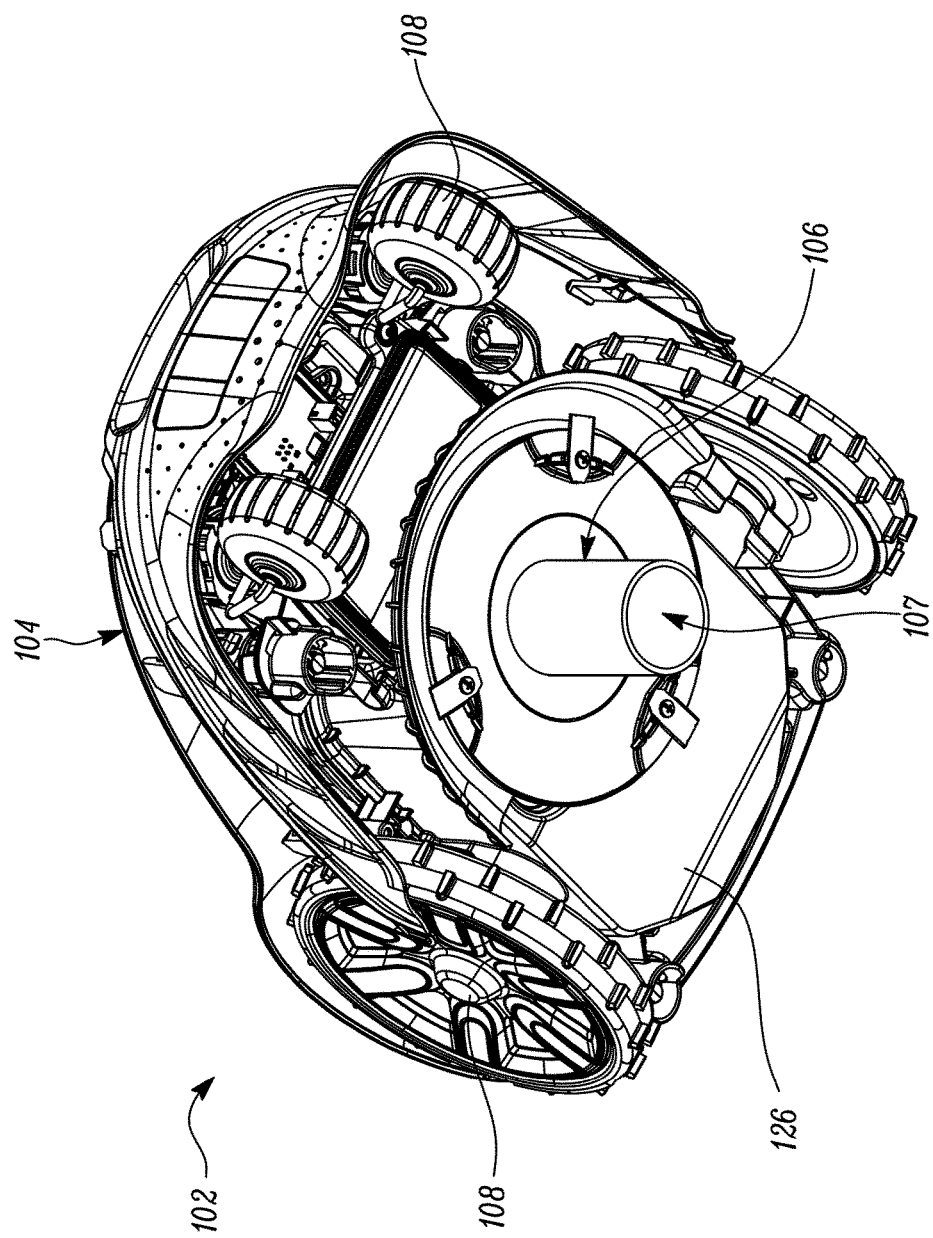
FIG. 3 shows a perspective view from a bottom of the watering robot of FIG. 2.

Referring to FIGS. 1 to 3, the watering system 100 includes a watering robot 102. The watering robot 102 includes a body 104. A connector portion 106 (shown in FIGS. 2, 3) is coupled to the body 104. The connector portion 106 connects with one or more water supply units 116', 116", 116'". The water supply units 116', 116", 116'" are generally referred to as 116 and are present within a region 114. The region 114 is a combined region constituted by parts 114', 114", 114'. The watering robot 102 further includes a plurality of ground engaging means 108 (shown in FIGS. 2, 3) such as, but not limited to, tires, wheels, or any other engaging means as used or known in the art. The watering robot 102 includes an irrigation controller 110 (shown in FIG. 2). The watering robot 102 further includes a sprinkler 112. The sprinkler 112 serves to apply water within the region 114 when the watering robot 102 connects or docks with the water supply units 116. The watering robot 102 operates (say mow, irrigate among other functions) within the region 114.

Herein, the region 114 is a lawn, which is divided into three parts 114', 114", 114'" although actual implementation of the present disclosure may have any number, arrangement, sizes of the parts 114', 114", 114'" of the region 114. Further, the region 114 includes the one or more water supply units 116, which are provided with a water supply as per the water distribution arrangement of the region 114. The water supplying units 116 may have a built-in water pipeline 118.

The watering robot 102 may have one or more implements (not shown) such as a cutters, knives, and the like which are used by the watering robot 102 to operate (i.e. mow) within the region 114. In some embodiments, the watering robot 102 has a blade. The blade may start working when the watering robot 102 starts realizing mowing function. The blade may be fixed to a lower surface of the watering robot 102. The watering robot 102 may have single or multiple numbers of blades. The watering robot 102 may have one or more of a reel blade, a deck blade, a mulching blade, a lifting blade, a low-lift blade, a medium-lift blade, a high-lift blade, and the like.

As illustrated in FIG. 2, the watering robot 102 has the plurality of ground engaging means 108. The ground engaging means 108 may include two rear wheels and two smaller wheels, or any other combination, type, position of the wheels as used or known in the relevant art. Additionally, or alternatively, the ground engaging means 108 may include a front caster, or a universal wheel. The caster wheel may help in changing direction or any other maneuvering by the watering robot 102.

The watering robot 102 may water the whole region 114 in stages i.e. the parts 114', 114", 114'". This will allow the watering robot 102 to effectively cover the whole region 114, by operating and/or irrigating the whole region 114 in the parts 114', 114", 114'". The irrigation controller 110 may control operating state of the watering robot 102 within the region 114. The irrigation controller 110 may be pre-programmed or setup with stored information to allow the watering robot 102 to operate automatically, or even semi-automatically as per the requirement.

Referring to FIGS. 2, and 3, the irrigation controller 110 may also control coupling or docking the watering robot 102 to the one or more water supply units 116. The watering robot 102 automatically couples to the one or more water supplying units 116 by the connector portion 106. The coupling is made with the built-in water pipeline 118 of the one or more water supplying units 116. The watering robot 102 is configured to lift up, move or rise with respect to a ground surface 120. The lifting up of the watering robot 102 helps to check any damage and, as a result, maintains grass within the parts 114', 114", 114". This prevents undesired prolonged interaction of the ground engaging means 108 (i.e. tires) of the watering robot 102 with the ground surface 120 and thereby prevents grass from tire marks and other such damage.

As illustrated in FIG. 3, the watering robot 102 includes the connector portion 106 below the body 104 and on a bottom surface 126 of the watering robot 102. The connector portion 106 is preferably provided at center of the bottom surface 126 for easy and balanced engagement of the connector portion 106 with the water supplying units 116. The connector portion 106 includes an engagement recess 107 which engages with the water supplying units 116.

In some embodiments, the watering robot 102 may be adapted to be integrated with a lawn mower (not shown). This may allow the watering robot 102 to work more effectively and cover substantial area of the region 114. The watering robot 102 integrates with the built-in water pipeline 118 to water different parts such as the part 114' of the region 114. Many such parts like parts 114', 114", 114' (referred to as the region 114 collectively) may be present in the region 114.

In some embodiments, the watering robot 102 may do mowing and watering together, in any particular order or sequence. The watering robot 102 may water the part 114' of the region 114 by either staying fixed or while moving. The watering robot 102 may water the complete region 114 by getting coupled to the one or more water supplying units 116 or any specific parts (say the part 114') on the basis of watering requirement. Further, there may be any arrangement, order, position, and other configurations of the one water supplying units 116 may be present in the region 114.

In some embodiments, the watering robot 102 may move over to dock itself to the water supply units 116. The irrigation controller 110 may control the watering robot 102 to locate and then dock with the water supply units 116. After docking, the watering robot 102 may start watering as per the pre-stored data with the irrigation controller 110 or based on any other user command.

In some embodiments, the connector portion 106 may be either removably coupled or fixed to the watering robot 102. When the connector portion 106 is removably coupled, the connector portion 106 may be integrated with the watering robot 102 as per requirements.

In some embodiments, the watering robot 102 may have the sprinkler 112 which may be one or more of rotor type sprinkler, spray type sprinklers, shrub style sprinklers, pop-up style sprinklers, rotors, rotary nozzles, and the like. Further, the sprinkler 112 may be an aquacontour sprinkler. The aquacontour sprinkler 112 may reduce irrigation overlaps and still allow efficient covering of the desired region 114.

The sprinkler 112 of the present disclosure is illustrated on the body 104 of the watering robot 102, however actual implementation of the present disclosure may have the sprinkler 122 on any part, position, location (such as rear, front, or top) of the watering robot 102.

Figure 4:
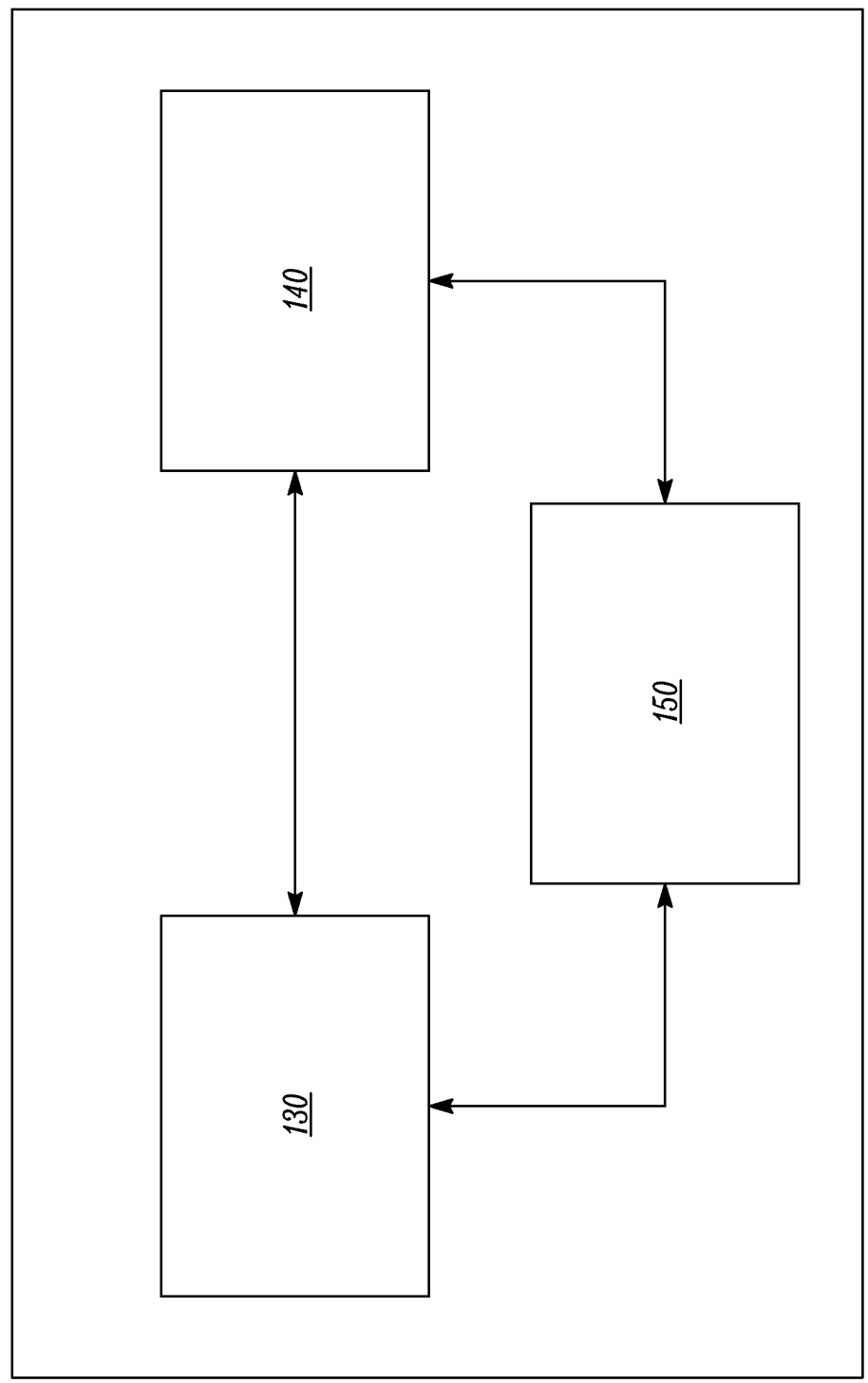
FIG. 4 shows a block diagram for a sensor and an actuator of the watering robot of FIG. 2.
Figure 5:
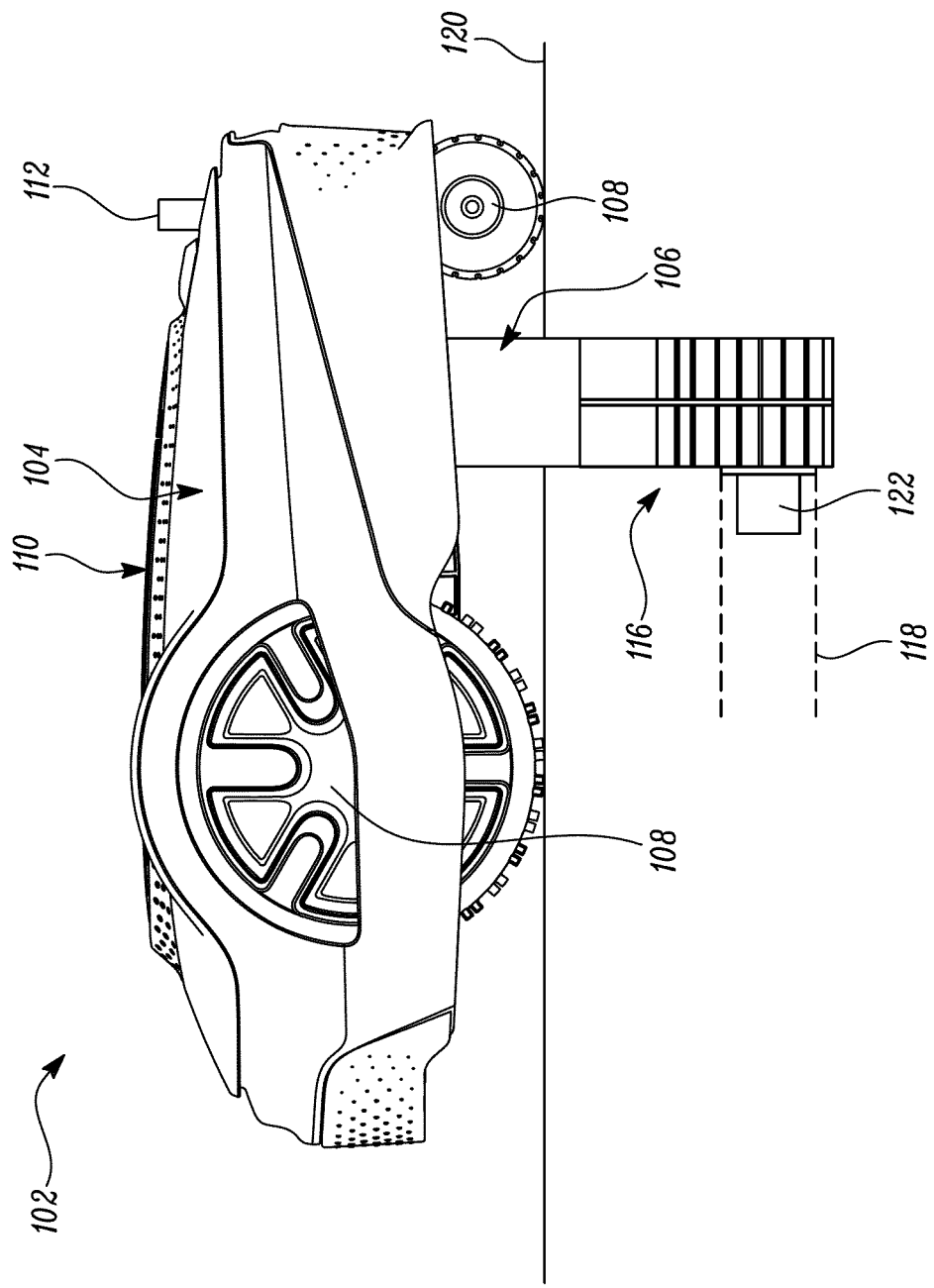
FIG. 5 shows a side view of the watering robot for assembly with a water supplying unit, in accordance with an aspect of the present disclosure.
Figure 6:
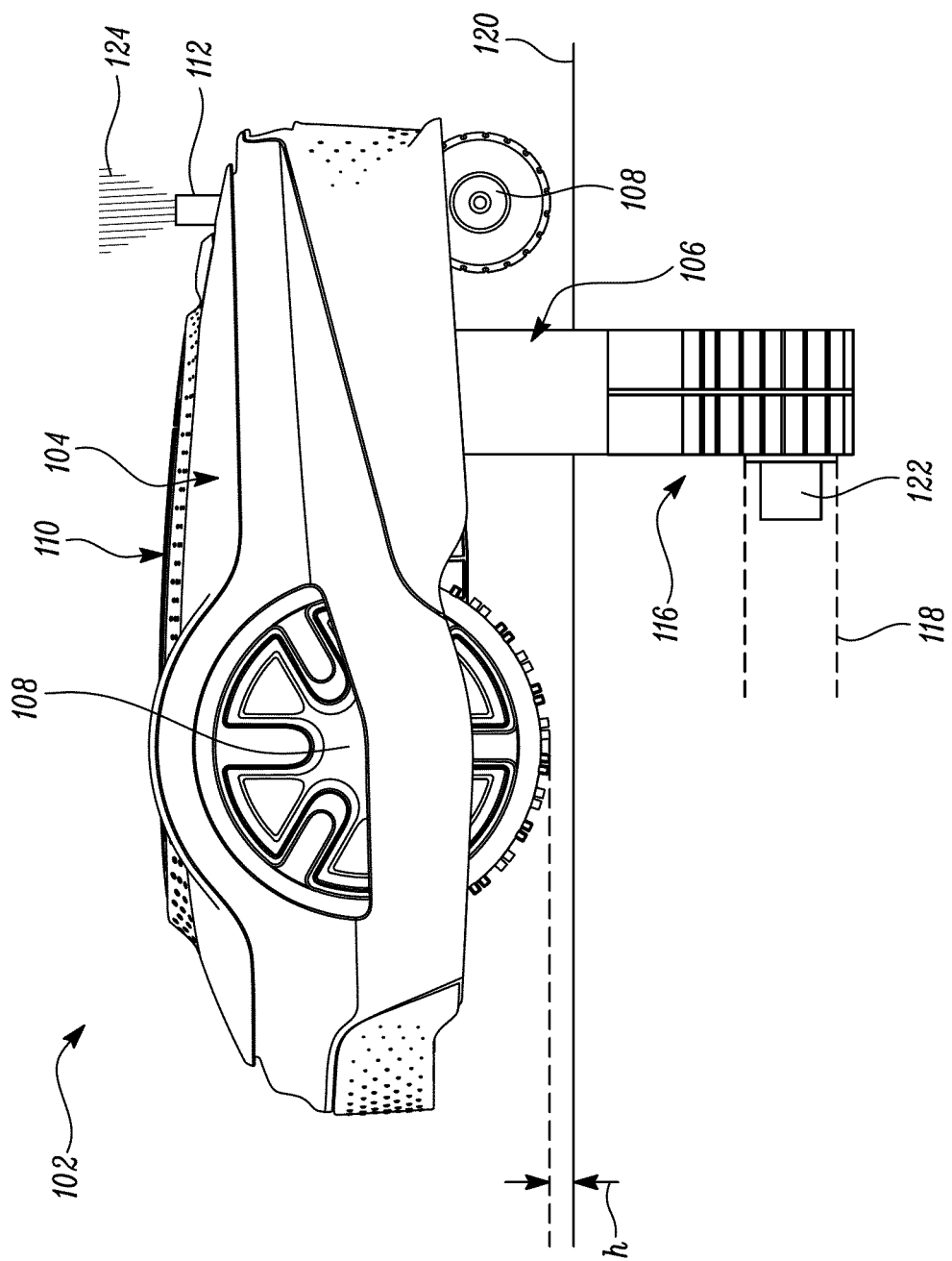
FIG. 6 shows a side view of the watering robot which is at least partially lift up and assembled with the water supplying unit, in accordance with an aspect of the present disclosure.

FIG. 4 illustrates a block diagram for the irrigation controller 110. The irrigation controller 110 includes a sensor 130 and an actuator 140 of the watering robot 102. The sensor 130 and the actuator 140 are adapted to take power from a power supply 150. The power supply 150 may power any part, or components of the watering robot 110. The sensor 130 of the watering robot 102 detect the one more water supplying units 116 within the region 114. The sensor 130 may include one or more of a camera, GPS, Bluetooth, or any other sensing means as used or known in the art. Further, the watering robot 102 selectively integrates with the one or more water supplying units 116 based on the detection by the sensor 130, as illustrated in FIG. 5. The actuator 140 of the watering robot 102 at least partially lift up the watering robot 102 with respect to the ground surface 120 of the region 114, as illustrated in FIG. 6. The watering robot 102 automatically couples with the one or more water supplying units 116 through the connector portion 106. The actuator 140 at least partially lifts up the watering robot 102 with respect to the ground surface 120 of the region 114 to irrigate at least a part 114', 114", 114'".

In some embodiments, the watering robot 102 may be directed or controlled by the irrigation controller 110, PC controller, wireless controller, and any other electronic technology. Additionally, or alternatively, the watering robot 102 may be controlled directly by sensors present onboard the watering robot 102.

In some embodiments, the watering robot 102 may be equipped with a camera (not shown). The camera may detect real-time image during working of the watering robot 102. This allows better control of the watering robot 102 during automatic working while monitoring the mowing and irrigation processes, and to prevent accidents and other avoidable circumstances.

FIGS. 5, 6 illustrate the watering robot 102. The watering robot 102 may lift up, move, or rise with respect to the ground surface 120 by action of the actuator 140. The lifting up of the watering robot 102, as illustrated in FIG. 6, by an elevation "h" allows the ground engaging means 108 to lift up above the ground surface 120. This ensures that there is no contact between the ground engaging means 108 and the ground surface 120 during irrigation by the sprinkler 112. The sprinkler 112 allows one or more sprinkler streams 124 for the irrigation operation. The elevation "h" of the watering robot 102 may ensure that any vibrations, forces, pressures during irrigation by the sprinkler streams 124 are not transferred to the ground surface 120. This helps to check any damage by the ground engaging means 108 to the ground surface 120 (such as the parts 114', 114" and 114'" of FIG. 1). This prevents undesired and prolonged interaction of the ground engaging means 108 (i.e. tires) of the watering robot 102 with the ground surface 120 and thereby prevents the ground surface 120 (say grass, and the like) from tire marks and other such damage.

During irrigation by the watering robot 102, the connector portion 106 remains in contact with the water supplying units 116, as illustrated in FIG. 6. Further, the water supplying units 116 include a pipe coupling portion 122. The pipe coupling portion 122 may be provided with each of the water supplying units to connect with the water pipeline 118. In some embodiments, the watering robot 102 may be configured such that the irrigation by the sprinkler 112 may activate only on detection of the lift up of the watering robot 102 by the elevation "h". The elevation "h" may be a slight lifting of the ground engaging means 108 just to ensure no contact with the ground surface 120. This check of the lift up may be made by the irrigation controller 110, more particularly the sensor 130. In an embodiment, during lift up of the watering robot 102, the actuator 140 may allow the connector portion 106 to change its length such that the watering robot 102 lifts up. Additionally, or alternatively, the actuator 140 may make any other lifting mechanism involving mechanical, hydraulic, electronic or a combination thereof to effectuate change of lifting up the watering robot 102 the elevation "h". This may take place without any involvement of the watering supplying units 116 during lift up of the watering robot 102.

In some embodiments, the water supplying units 116 may limit the use of hose pipes in gardens, lawns, and the like. The presence of the water supplying units 106 thus allows to limit or lower unnecessary hosing arrangements in the region 114.

In some embodiments, the watering robot 102 of the watering system 100 is light-weight, compact, simple, convenient, and easy to maintain for a common user. The watering system 100 may significantly reduce manual operation. Further, the watering system 100 is suitable for home gardens, parkland, and other outdoor applications. The watering system 100 undertakes autonomous lawn mowing and irrigation work, with limited human intervention.

In the drawings and specification, there have been disclosed preferred embodiments and examples of the invention and, although specific terms are employed, they are used in a generic and descriptive sense only and not for the purpose of limitation of the scope of the invention being set forth in the following claims.

LIST OF ELEMENTS

100 Watering System
102 Watering Robot
104 Body
106 Connector Portion
107 Engagement Recess
108 Ground engaging means
110 Irrigation Controller
112 Sprinkler
114 Region
114' Part
114" Part
114' Part
116', 116", 116'" (116) Water Supply Units
118 Water Pipeline
120 Ground Surface
122 Pipe Coupling Portion
124 Sprinkler Streams
126 Bottom Surface
130 Sensor
140 Actuator
150 Power Supply

The invention claimed is:

1. A watering system comprising:
one or more water supplying units configured to operate within a region;
a watering robot including:
an irrigation controller configured to operate within the region;
a connector portion coupled to a body of the watering robot, wherein the connector portion is adapted to couple with the one or more water supplying units and receive water from the one or more water supplying units;
a sensor configured to detect the one more water supplying units within the region, the watering robot selectively integrating with the one or more water supplying units based on the detection by the sensor,
wherein the watering robot is configured to automatically couple with the one or more water supplying units through the connector portion,
wherein an actuator of the watering robot at least partially lifts up the watering robot with respect to a ground surface of the region to irrigate at least a part of the region,
wherein during lift up of the watering robot, the actuator allows the connector portion to change its length such that the watering robot lifts up.

2. The watering system of claim 1, wherein the irrigation controller includes an aquacontour sprinkler.

3. A watering robot comprising:
a body supported on a plurality of ground engaging means, wherein the ground engaging means are adapted to propel the body on a region, wherein the region includes one or more water supplying units;
a connector portion coupled to the body, wherein the connector portion is adapted to couple with the one or more water supplying units and receive water from the one or more water supplying units;
a sensor configured to detect the one more water supplying units within the region, the watering robot selectively integrating with the one or more water supplying units based on the detection by the sensor,
wherein the watering robot is configured to automatically couple with the one or more water supplying units through the connector portion,
wherein an actuator at least partially lifts up the watering robot with respect to a ground surface of the region to irrigate at least a part of the region,
wherein during lift up of the watering robot, the actuator allows the connector portion to change its length such that the watering robot lifts up.

4. The watering robot of claim 3, wherein the watering robot is adapted to be integrated with a lawn mower.

5. The watering robot of claim 3, wherein the region is a lawn.

6. The watering robot of claim 3, wherein the watering robot integrates with a built-in water pipeline of the one or more water supplying units.

* * * * *